United States Patent Office 2,767,170
Patented Oct. 16, 1956

2,767,170

PREPARATION OF ALKALI CELLULOSE

Paul E. Graybeal, Mansion Hills, and William H. Stevenson, Colonial Heights, Va., assignors to Hercules Powder Company, Wilmington, Del., a corporation of Delaware No Drawing. Application August 29, 1951,
Serial No. 244,262

5 Claims. (Cl. 260—233)

This invention relates to the manufacture of alkali cellulose and particularly to the manufacture of alkali cellulose suitable for the preparation of alkali-soluble and water-soluble cellulose ethers.

It is well recognized that uniform distribution of caustic alkali and water on the cellulose is a basic requirement for a good quality cellulose ether. It is also well recognized that degradation in the alkali cellulose arising from mechanical agencies carries through to the finished cellulose ether and results in instability, poor strength properties and poor color in the cellulose ether.

Although numerous processes have been proposed and utilized to prepare alkali cellulose for use in making alkali-soluble and water-soluble cellulose ethers, it has not been possible heretofore to obtain a uniform distribution of caustic alkali and water on the cellulose without employing a considerable excess of caustic alkali reagent which is wasteful. Even with an excess of caustic alkali reagent, there is frequently a sufficiently nonuniform distribution of caustic alkali and water on the cellulose so that excessive insoluble fibers and particles appear in the final cellulose ether product. Moreover, many of the processes heretofore proposed have resorted to drastic and severe mechanical rubbing or grinding together of the caustic reagent and cellulose to foster a more uniform distribution of the caustic alkali on the cellulose. Such drastic mechanical treatment always results in undesirable degradation of the alkali cellulose formed.

Now in accordance with this invention a uniform alkali cellulose suitable for the preparation of various alkali-soluble and water-soluble cellulose ethers is prepared by a slurry process wherein cellulose in particulate form suspended in an inert organic slurrying medium is contacted in the slurry with caustic alkali and water. This is accomplished by establishing a liquid attrition zone within the slurry, repeatedly passing successive portions of the cellulosic slurry into and through the liquid attrition zone, and subjecting the cellulose in the liquid attrition zone to a disaggregation and pulling apart of cellulose fibers and a rubbing together and movement relative to each other of the cellulose fibers in the presence of the caustic alkali and water. For optimum results the process preferably should be carried out at a temperature below about 25° C.

While the process in accordance with this invention is broadly applicable for the preparation of alkali cellulose from any type of chemical cellulose in particulate form, it is particularly applicable for the preparation of alkali cellulose from those types of fibrous cellulose which have a marked tendency to persist as fiber aggregates in the slurry, such as, for example, shredded, fluffed, or granulated cellulose.

In a preferred embodiment of the invention a body of slurry is formed containing up to about 6% by weight of fibrous cellulose based on the combined weights of cellulose and slurrying medium and containing also between about 0.2 part and about 1.8 parts of caustic alkali and between about 0.5 part and about 8.0 parts of water per part of cellulose.

Alkali cellulose prepared in accordance with this invention has a remarkably uniform distribution of the caustic alkali and water on the cellulose as evidenced by the uniform solubility characteristics of cellulose ethers prepared from it. Moreover, the alkali cellulose of this invention is substantially free of harmful degradation arising from mechanical rubbing or grinding together of the caustic reagent and cellulose.

The general nature of the invention having been set forth, the following examples are presented in specific illustration but not in limitation thereof.

*Example 1*

Thirty lb. of purified shredded wood pulp containing approximately 5% of moisture was added with agitation to 100 gal. of isopropanol containing 13% by weight of water in a suitable vessel to form a slurry. The shredded pulp being fibrous and fluffed up tended to associate and mat together in the slurry into fiber aggregates, and ordinary stirring of the slurry did not break up or disrupt these aggregates. The vessel in which the slurry was formed was equipped with a Cowles high velocity dissolver with the rotary impeller disk situated so that it was submerged in the slurry. With the Cowles dissolver operating, 37.5 lb. of a 40% aqueous solution of sodium hydroxide was added to the slurry over a period of 15 minutes, and the reaction was continued with the Cowles dissolver operating for an additional two-hour period. The slurry was maintained between 23° and 24° C. throughout the process.

The impeller of the Cowles dissolver because of its special vaned construction, and rotating at a high speed of approximately 1200 R. P. M., established a liquid attrition zone within the slurry immediately adjacent to the surface of the rapidly rotating impeller disk. Additionally, a rapid and efficient vortical circulation of the entire slurry body was created by the rapidly rotating impeller disk so that successive portions of the fibrous cellulosic slurry were caused to pass repeatedly into and through the liquid attrition zone. The cellulosic fiber aggregates were subjected in the liquid attrition zone to a disaggregation and pulling apart of cellulose fibers and a rubbing together and movement relative to each other of the cellulose fibers in the presence of the caustic alkali and the water, the caustic alkali and water becoming uniformly distributed on the cellulose to form a uniform alkali cellulose in situ in the slurrying medium.

The system contained approximately 4.2% by weight of cellulose (containing approximately 5% water) based on the combined weights of cellulose and slurrying medium. Taking into account the water present in the cellulose, the slurrying medium, and the aqueous alkali solution, the system contained approximately 0.526 part sodium hydroxide per part of moisture-free cellulose, and 3.92 parts water per part of moisture-free cellulose, and the total amounts of water and sodium hydroxide in the system corresponded to an aqueous sodium hydroxide solution of approximately 11.8% concentration.

The alkali cellulose in isopropanol formed in this example was etherified in the slurry by reacting the alkali cellulose with 17.6 parts monochloroacetic acid at about 70° C. for approximately 3 hours, while maintaining vigorous circulation in the slurry by means of the Cowles dissolver. A water-soluble carboxymethylcellulose having approximately 0.69 carboxymethyl group per anhydroglucose unit in the cellulose was produced without employing any additional caustic alkali or any additional water. The resulting cellulose ether exhibited unusually good solubility and uniformity.

A carboxymethyl cellulose ether was produced using exactly the same proportions of ingredients as set forth above and following the same procedure except that in place of the Cowles dissolver a turbo mixer providing ordinary agitation was employed in preparing the alkali cellulose and in the subsequent etherification. The resulting cellulose ether was nonuniform and did not dissolve completely in water. In order to approach the same desirable uniformity and solubility obtained in the cellulose ether when employing the Cowles dissolver, it was necessary with ordinary agitation with a turbo mixer to employ approximately twice as much sodium hydroxide in preparation of the alkali cellulose and approximately twice as much monochloroacetic acid in the etherification, the degree of substitution being substantially the same in both cases.

*Examples 2–5*

Following substantially the same procedure set forth in Example 1, wherein a Cowles high velocity dissolver was employed, a series of alkali celluloses was prepared. Table 1 following lists ingredients, proportions, ratios, and further pertinent data relating to these. In each instance a highly uniform alkali cellulose was formed in situ in the slurrying medium. In each instance the alkali cellulose was subsequently etherified in the slurry to produce a water-soluble carboxymethylcellulose having good solubility and good uniformity without employing any additional caustic alkali or any additional water. In no instance could the quality and substitution level of the cellulose ether prepared in any of these runs be duplicated with ordinary means of agitation such as paddle stirrers, turbo mixers, and the like without employing substantially larger proportions of caustic alkali in the alkali cellulose preparation and substantially larger proportions of monochloroacetic acid in the etherification, in no instance less than 30% more and in some instances as much as 100% more reagent being required.

the water on the cellulose with substantially smaller quantities of caustic reagent than is otherwise possible.

It is important to note that, although cellulosic fiber aggregates are pulled apart and disaggregated and the fibers are rubbed together and moved relative to each other in the liquid attrition zone, there is substantially no breaking up or attrition of the individual cellulosic fibers. This is in marked contrast to the severe attrition of individual cellulosic particles or fibers which occurs when cellulose is mechanically rubbed up or ground with caustic alkali in hammer mills, ball mills, and the like.

There are various suitable means by which a liquid attrition zone can be established within the slurry. In one embodiment a jet, or plurality of jets, is directed into the cellulosic slurry in a suitable vessel. The liquid for this jet or jets is supplied by withdrawing liquid from the vessel, with or without selected portions of the cellulosic material, and returning the same to the vessel under pressure through one or more jets or nozzles. The jet is directed against and through the slurry whereby the disaggregating and shearing action of fibrous aggregates shot against fibrous aggregates is added to the disruptive, shearing effect of the high-velocity fluid from the jet rapidly traveling into and past the fluid and cellulosic material constituting the slurry in the vessel which has relatively much slower movement. The jet or jets will have such a speed relative to the speed of the slurry through which it passes as to have a disaggregating and pulling apart action on fibrous aggregates within the liquid attrition zone established by the jet or jets. The velocity of the jets best suited for use in connection with the disaggregation of any specific type of cellulosic aggregates can best be determined by experiment. In general, if the cellulosic aggregates are relatively resistant to disaggregation, relatively high velocities will be found most ef-

TABLE 1

| Example | Type Cellulose | NaOH Added (Parts by wt.) and Conc. | Additional Water (Parts by wt.) | Alkali Cellulose Cycle ||| Ratio NaOH to Cellulose [1] (Parts per Part) | Ratio Total Water to Cellulose [1] (Parts per Part) | Concentration of NaOH [1] (Percent by Weight) | Monochloroacetic Acid for Etherification [2] (Parts by wt.) | Degree of Substitution in the Cellulose Ether [3] |
|---|---|---|---|---|---|---|---|---|---|---|---|
| | | | | Caustic Addition (Time in min.) | Alkali Cellulose Preparation (Hours) | Temperature During Alkali Cellulose Preparation, °C. | | | | | |
| 2 | Shredded Linters | 15.2 Flake NaOH (100%). | 5.6 | 60 | 2 | 20.5 | 0.53 | 3.33 | 13.7 | 17.6 | 0.72 |
| 3 | Shredded Wood Pulp. | 30 parts of 50% solution. | | 15 | 2 | 20 | 0.526 | 3.66 | 12.5 | 17.6 | 0.69 |
| 4 | Shredded Linters | 70 parts of 30% solution. | | 15 | 2 | 19–20 | 0.737 | 5.20 | 12.4 | 24.5 | 0.83 |
| 5 | Shredded Wood Pulp. | 52.5 parts of 40% solution. | | 14 | 2 | 24 | 0.737 | 2.89 | 15.9 | 24.5 | 0.84 |

In all instances 30 parts of cellulose (containing approximately 5% by weight of water was slurried in 676.3 parts of isopropanol containing 13% by weight of water. On the same basis as set forth in Example 1, the cellulose concentration in the slurry was 4.2% in each example.
[1] Calculated on same basis as set forth in Example 1.
[2] Etherification as set forth in Example 1.
[3] Carboxymethyl group per anhydroglucose unit in the cellulose.

Alkali celluloses prepared in accordance with this invention have been employed in the preparation of various other alkali-soluble and water-soluble cellulose ethers including hydroxyethyl cellulose, hydroxyethyl carboxymethylcellulose, sulfoethyl cellulose, methyl cellulose, methyl carboxymethylcellulose, carboxyethyl cellulose, and the like. In every instance the cellulose ethers exhibited good uniformity and good solubility characteristics at substantially lower ingredient consumption for the same degree of substitution than was possible by ordinary means of agitation such as provided by paddle mixers, turbo mixers, tumbling and the like.

An important feature of this invention is the establishment of a liquid attrition zone within the slurry wherein cellulosic fiber aggregates are disaggregated and pulled apart and wherein the fibers are rubbed together and moved relative to each other in the presence of the caustic alkali and the water. It has been discovered that this effects a uniform distribution of the caustic alkali and fective, while lower velocities are effective for fibrous cellulosic aggregates which are less resistant. For some purposes velocities as low as 1000 feet per minute are sufficient although for other purposes velocities as high as 5000 feet per minute are more advisable.

The jet action and impact action can be assisted by a secondary impact action in which the jets are directed substantially tangentially or somewhat obliquely toward and across a fixed and preferably roughened or corrugated plate. It is important when such a plate is used that the end of the jet nozzle from which the jet issues be placed near the plate, because the force of the jet is soon dissipated in the body of the slurry. It is desirable to create a circulatory motion to the body of the slurry in the vessel to insure that all parts of the cellulosic slurry will be brought into the path of the jets repeatedly.

In another embodiment a liquid attrition zone is established in the slurry by employing circular impeller disks rotating at high peripheral velocities of the order of 2000 to 15,000 feet per minute, and submerged in the slurry. Such impeller disks preferably should have a multiplicity of suitably raised vanes or depressed grooves, forming a symmetrical radial or arcuate pattern of alternate raised and lowerd portions around the impeller disk. Another suitable design embodies a multiplicity of raised vanes with inclined knife edges set obliquely in a symmetrical pattern around the periphery of the impeller disk.

Such submerged impeller disks rotating at high peripheral speeds in the cellulosic slurry create or establish an efficient liquid attrition zone within the slurry immediately adjacent to the surface of the rapidly rotating impeller disk. Additionally, the rapidly rotating impeller disk sets up a rapid and efficient vortical circulation of the entire slurry body so that successive portions of the cellulosic slurry are drawn repeatedly into and through the liquid attrition zone.

The impeller disk should be rotated at a rate sufficient to discharge the slurry at the rim of the impeller at a velocity of at least 1000 feet per minute, and in some cases at considerably higher velocities, as, for example, between 1000 and 2000 feet per minute, the particular velocity selected in excess of 1000 feet per minute depending on the toughness of the fiber aggregates being treated.

Fiber aggregates drawn into the liquid attrition zone immediately adjacent to the rapidly rotating impeller disk by the vortical circulation set up in the slurry are subjected to a rubbing action both against the disk and against adjacent fibers, and fibers are pulled apart and disaggregated, without, however, being subjected to any harmful attrition of the individual fibers themselves. This action in the presence of the caustic alkali and water effects uniform contact of all fibers with the caustic alkali and water, and effects uniform distribution of these reagents on the cellulose fibers to produce a uniform alkali cellulose.

A preferred means for carrying out the improvement in accordance with this invention is provided by a Cowles high velocity dissolver, as illustrated in the examples.

In carrying out the process in accordance with this invention, it is desirable to maintain the slurry at a temperature below about 25° C. throughout the process in order to obtain optimum results. However, higher temperatures up to 50° C. or even 60° C. may be employed if desired.

The cellulose in particulate form may be derived from any suitable and well-known source of chemical cellulose, such as cotton linters, wood pulp, and the like. The cellulosic material may be bulk dried, sheet dried, or otherwise prepared. It may be finely cut or ground to fine particles, or it may be shredded, fluffed, cut into small shreads or granules, or otherwise treated. In any of these forms, the cellulosic material is in a particulate form suitable for the purpose of this invention. As pointed out hereinbefore, the process in accordance with this invention is particularly adapted for the preparation of alkali cellulose from those types of fibrous cellulose which have a marked tendency to persist as fiber aggregates in the slurry such as shreadded, fluffed, or granulated cellulose.

The process in accordance with this invention ordinarily finds its greatest application in the treatment of slurries containing up to about 6% by weight of fibrous cellulose based on the combined weights of cellulose and slurrying medium. Although uniform alkali cellulose in accordance with this invention can be prepared from cellulosic slurries containing greater amounts of cellulose, ordinarily this requires somewhat longer reaction times to properly distribute the alkali and the water on the cellulose uniformly. Experience has demonstrated that with slurries containing up to 6% fibrous cellulose formation of a uniform alkali cellulose requires between about ½ hour and about 2 hours.

In forming the slurry of cellulose in accordance with this invention, it is immaterial whether the slurrying medium is added to the cellulose or whether the cellulose is added to the slurrying medium, since either method of operation results in the formation of a satisfactory slurry. Preferably, the two should be mixed together with agitation.

The slurrying medium in accordance with this invention is a volatile organic liquid which is inert chemically toward the several reactants, including the cellulose, caustic alkali, water, and etherifying agent, and which has no solvent action on the cellulose, alkali cellulose, or the cellulose ether subsequently formed. Suitable inert organic slurrying media include, by way of example, aromatic hydrocarbon such as benzene or toluene; aliphatic hydrocarbons such as heptane, petroleum ether, gasoline, and the like; aliphatic alcohols such as ethyl, propyl, isopropyl, butyl, secondary butyl, isobutyl, tertiary butyl, methyl propyl carbinol, diethyl carbinol, methyl isopropyl carbinol, tertiary amyl, fusel oil, pentasol, and the like; dioxane, tetrahydrofuran, and mixtures thereof. It is presently preferred to select the slurrying medium from the aliphatic alcohols having from 2 to 5 carbon atoms in the molecule, dioxane, tetrahydrofuran and mixtures thereof. Particularly suitable slurrying media include isopropyl alcohol and tertiary butyl alcohol.

The slurrying media in accordance with this invention may be anhydrous or may contain varous amounts of water, as desired. For instance, it is often more practical and convenient to employ an azeotropic mixture of an alcohol and water rather than the anhydrous medium. It is necessary, however to know how much water is present in the slurrying medium in order to properly adjust the alkali cellulose system for required total water content.

It has been found in accordance with this invention that the optimum alkali-to-cellulose ratio for the most efficient preparation of alkali-soluble or water-soluble cellulose ethers should be within the range between about 0.2 part and about 1.8 parts for each part of cellulose, both being calculated on a moisture-free basis. Similarly, it has been found that the optimum water-to-cellulose ratio should be within the range between about 0.5 part and about 8.0 parts for each part of cellulose in a moisture-free state. In arriving at the water-to-cellulose ratio, the total water added must be taken into consideration; that is, all water present in the slurrying medium, moisture in the cellulose, and water added with the caustic alkali must be totaled with free water added per se to the system in order to arrive at the water-to-cellulose ratio.

Although sodium hydroxide is the preferred caustic alkali in accordance with this invention, any of the alkali metal hydroxides may be employed, as desired.

The process of this invention provides highly uniform alkali cellulose substantially free of degradation arising from harmful mechanical attrition of the fibers at substantially lower levels of reagent consumption as compared to prior art processes. It provides alkali cellulose in a highly desirable form and of a composition particularly suitable for preparation of alkali-soluble and water-soluble cellulose ethers of improved stability, uniformity and solubility characteristics as compared to prior art processes.

What we claim and desire to protect by Letters Patent is:

1. In a slurry process for preparing alkali cellulose from types of fibrous cellulose which have a marked tendency to persist as fiber aggregates in the slurry wherein fibrous cellulose of the indicated type cellulose in particulate form suspended in an inert organic slurrying medium is contacted in the slurry with caustic alkali and water, the improvement comprising establishing a liquid attrition zone within the body of slurry, imparting velocities of at least about 1000 feet per minute to the slurry in the liquid attrition zone relative to the body of slurry, and repeatedly passing successive portions of the cellulosic slurry into and through the liquid attrition zone, whereby the cellulose in the liquid attrition zone is subjected to a disaggregation and pulling apart of cellulose fibers and a rubbing together and movement relative to each other of the cellulosic fibers in the presence of the caustic alkali and water.

2. In a slurry process for preparing alkali cellulose from types of fibrous cellulose which have a marked tendency to persist as fiber aggregates in the slurry wherein fibrous cellulose of the indicated type cellulose in particulate form suspended in an inert organic slurrying medium is contacted in the slurry with caustic alkali and water at a temperature below about 25° C., the improvement comprising establishing a liquid attrition zone within the body of slurry, imparting velocities of at least about 1000 feet per minute to the slurry in the liquid attrition zone relative to the body of slurry, and repeatedly passing successive portions of the cellulosic slurry into and through the liquid attrition zone, whereby the cellulose in the liquid attrition zone is subjected to a disaggregation and pulling apart of cellulose fibers and a rubbing together and movement relative to each other of the cellulose fibers in the presence of the caustic alkali and water.

3. In a slurry process for preparing alkali cellulose from types of fibrous cellulose which have a marked tendency to persist as fiber aggregates in the slurry wherein fibrous cellulose of the indicated type suspended in an inert organic slurrying medium is contacted in the slurry with caustic alkali and water, the improvement comprising forming a body of slurry containing up to about 6% by weight of said fibrous cellulose based on the combined weights of cellulose and slurrying medium and containing also between about 0.2 part and 1.8 parts of caustic alkali and between about 0.5 part and 8.0 parts of water per part of cellulose, establishing a liquid attrition zone within the body of slurry, imparting velocities of at least about 1000 feet per minute to the slurry in the liquid attrition zone relative to the body of slurry, and repeatedly passing successive portions of the fibrous cellulose slurry into and through the liquid attrition zone, whereby the cellulose in the liquid attrition zone is subjected to a disaggregation and pulling apart of cellulose fibers and a rubbing together and movement relative to each other of the cellulose fibers in the presence of the caustic alkali and the water.

4. In a slurry process for preparing alkali cellulose from types of fibrous cellulose which have a marked tendency to persist as fiber aggregates in the slurry wherein fibrous cellulose of the indicated type suspended in an inert organic slurrying medium is contacted in the slurry with caustic alkali and water at a temperature below about 25° C., the improvement comprising forming a body of slurry containing up to about 6% by weight of said fibrous cellulose based on the combined weights of cellulose and slurrying medium and containing also between about 0.2 part and 1.8 parts of caustic alkali and between about 0.5 and 8.0 parts of water per part of cellulose, establishing a liquid attrition zone within the body of slurry, imparting velocities of at least about 1000 feet per minute to the slurry in the liquid attrition zone relative to the body of slurry, and repeatedly passing successive portions of the fibrous cellulose slurry into and through the liquid attrition zone, whereby the cellulose in the liquid attrition zone is subjected to a disaggregation and pulling apart of cellulose fibers and a rubbing together and movement relative to each other of the cellulose fibers in the presence of the caustic alkali and water.

5. In a slurry process for preparing alkali cellulose from types of fibrous cellulose which have a marked tendency to persist as fiber aggregates in the slurry wherein fibrous cellulose of the indicated type suspended in an inert organic slurrying medium is contacted in the slurry with caustic alkali and water, the improvement comprising forming a body of slurry containing up to about 6% by weight of said fibrous cellulose based on the combined weights of cellulose and slurrying medium and containing also between about 0.2 part and 1.8 parts of caustic alkali and between about 0.5 part and 8.0 parts of water per part of cellulose, establishing a liquid attrition zone within the cellulose, establishing a liquid attrition zone within the body of slurry, imparting velocities of at least about 1000 feet per minute to the slurry in the liquid attrition zone relative to the body of slurry, and repeatedly passing successive portions of the fibrous cellulose slurry into and through the liquid attrition zone, whereby the cellulose in the liquid attrition zone is subjected to a disaggregation and pulling apart of cellulose fibers and a rubbing together and movement relative to each other of the cellulose fibers in the presence of the caustic alkali and the water which is continued for a period of time between about one-half hour and about two hours while maintaining the slurry at a temperature below about 25° C.

References Cited in the file of this patent

UNITED STATES PATENTS

| | | |
|---|---|---|
| 2,180,517 | Goff | Nov. 21, 1939 |
| 2,274,463 | Stoeckly et al. | Feb. 24, 1942 |
| 2,313,866 | Finlayson | Mar. 16, 1943 |
| 2,680,737 | Grassie et al. | June 8, 1954 |
| 2,680,738 | Laughlin | June 8, 1954 |

FOREIGN PATENTS

| | | |
|---|---|---|
| 478,255 | Great Britain | Jan. 14, 1938 |